(12) United States Patent
Fujino et al.

(10) Patent No.: US 6,786,490 B2
(45) Date of Patent: Sep. 7, 2004

(54) METAL GASKET

(75) Inventors: Michio Fujino, Yokohama (JP); Yutaka Miyata, Yokohama (JP); Hironobu Imanaka, Yokohama (JP); Takeshi Murata, Yokohama (JP)

(73) Assignee: Nichias Corporation, Tokyo (JP)

( * ) Notice: Subject to any disclaimer, the term of this patent is extended or adjusted under 35 U.S.C. 154(b) by 79 days.

(21) Appl. No.: 10/103,588

(22) Filed: Mar. 21, 2002

(65) Prior Publication Data

US 2002/0135135 A1 Sep. 26, 2002

(30) Foreign Application Priority Data

Mar. 23, 2001 (JP) .......................................... 2001-085586

(51) Int. Cl.[7] .............................................. F16J 15/14
(52) U.S. Cl. ........................ 277/590; 277/591; 277/595
(58) Field of Search ................................ 277/590, 591, 277/594, 595, 596

(56) References Cited

U.S. PATENT DOCUMENTS 5,427,388 A * 6/1995 Ueta ........................... 277/595
6,027,124 A * 2/2000 Ishida et al. ................. 277/595
6,283,480 B1 * 9/2001 Miura et al. ................. 277/593

FOREIGN PATENT DOCUMENTS

JP            1-285645        * 11/1989

OTHER PUBLICATIONS

Japanese Publication No. Hei 2–6855A, Jan. 1990.
Japanese Publication No. Sho 62–115562A, Jul. 1987.

* cited by examiner

*Primary Examiner*—William L. Miller
(74) *Attorney, Agent, or Firm*—Flynn, Thiel, Boutell & Tanis, P.C.

(57) ABSTRACT

A metal gasket for a high performance of an engine includes two sheets of elastic metal substrates providing a bead on peripheral portion of a cylinder opening and an annular thin metal plate that is thinner than the elastic metal substrates and surrounds the cylinder opening and is arranged between the substrates. The annular thin metal plate is fixed on the substrate by inserting an engaging portion solidly projected from the outside periphery into a slit formed on the substrate and folding the plate. Due to the thin metal plate, the cylinder opening peripheral portion has a high seal contact pressure in contrast to other locations. Moreover, the contact pressure of the cylinder opening peripheral portion becomes uniform.

7 Claims, 6 Drawing Sheets

METAL GASKET

BACKGROUND OF THE INVENTION

1. Field of the Invention

The present invention relates to an improvement of a metal gasket, which is interposed between a cylinder block and a cylinder head of an internal combustion engine.

2. Description of the Related Art

An internal combustion engine has a metal gasket to be interposed and fastened on a joint surface between a cylinder block and a cylinder head so as to be given a sealing function.

Particularly, a sealing in the area surrounding a cylinder opening is important and, if the sealing in this portion is not sufficient, there develops a pressure drop inside a combustion chamber and thus an overheat.

Hence, a bead, which is concentric with the cylinder opening, is provided on an elastic metal substrate which forms the metal gasket and, by utilizing repulsion of the bead which is generated when the metal gasket is fastened by a bolt, the sealing function is given to the area surrounding the cylinder opening.

At this time, in order to prevent a fatigue fracture of the bead, for example, a stopper is provided to a flat portion between the cylinder opening of the metal gasket and the bead so as to control magnitude of bead amplitude.

Regarding an installed position and a shape of the stopper, there is a technology disclosed, for example, in Japanese Utility Model Application Laid-Open No. 2-6855. This technology is such that a full bead is formed on a sheet of the elastic metal substrate and a shim is fixed on a flat surface which is nearer to the cylinder opening than the bead, so that a cylinder opening peripheral portion becomes thicker for a bolt fastening portion.

Further, the technology disclosed in Japanese Utility Model Application Laid-Open No. 62-115562 is such that a full bead is formed on a sheet of the elastic metal substrate and a metal sub-plate is provided in opposition to an convex portion side of the full bead, and the cylinder opening peripheral portion of this sub-plate is folded on the flat portion of the full bead side of the substrate so that, similarly as described above, the cylinder opening peripheral portion becomes thicker for the bolt fastening portion.

These metal gaskets prevent an overall bend of the bead and vibration amplitude at a driving time by a thick plate portion provided on the cylinder opening flat portion of the full bead and, further, are utilized as stoppers which seal combustion gas.

SUMMARY OF THE INVENTION

In recent years, miniaturization and weight reduction, increasing output and saving fuel consumption due to the rapid technological innovation of the internal combustion engine have progressed so much. Consequently air-fuel mixture has become leaner and, vibration amplitude of the cylinder head has had a tendency to further escalate by the weight of auxiliary machines as accompanied with rise in combustion temperatures.

In view of the tendency, the prior art has provided a stopper portion of a metal sub-plate on the flat portion between the cylinder opening peripheral portion bead and the cylinder opening peripheral portion. However, due to miniaturization of the engine, a pitch of the cylinder opening has become narrower with a result that the width of the stopper has also inevitably become narrower. For this reason, a contact pressure on the sub-plate partially becomes high contact pressure. Further, due to vibration amplitude as well as volume expansion which are generated by operating the engine, a subsidence gradually develops on a engine surface and, as a result, there arises a phenomenon that the function as a stopper is declined, thereby causing a power depression and a overheat.

The present invention has been carried out in view of the problem and aims to provide the metal gasket which can cope with high performance of the engine.

In order to achieve the object, the outline of the present invention is that a metal gasket is interposed between a cylinder block and a cylinder head and seals between both surfaces, wherein the metal gasket comprises an elastic metal substrate provided with a bead in a cylinder opening peripheral portion; a portion arranged at a convex portion side of the bead, and constituted by a metal thin plate which is thinner than the elastic metal substrate.

According to the constitution, the cylinder opening peripheral portion has high seal contact pressure in contrast to other portions due to the metal thin plate and, moreover, the contact pressure of the cylinder opening peripheral portion becomes uniform.

Further, by fastening the bead further by full compression, stress amplitude of the bead is reduced and fatigue resistance of the bead is improved and irregularity of a cylinder deck surface is covered up by the bead having high seal contact pressure.

Further, in the metal gasket constituted as described above, by forming a bead having the same direction as the bead of the elastic metal substrate on the metal thin plate for the cylinder opening peripheral portion, a bead spring constant of the cylinder opening peripheral portion is enhanced and still higher seal contact pressure can be obtained.

The metal gasket may have a constitution wherein the metal thin plate is arranged among a plurality of elastic metal substrates.

Further, in the metal gasket, the metal thin plate is fixed in the outside area of the bead provided on the cylinder opening peripheral portion of the elastic metal substrate.

The metal thin plate is fastened on the elastic metal substrate at a position from the edge of the cylinder side of a water pore outside of the cylinder of the engine to the distant side edge of the cylinder in the water pore, so that functional influences over the seal contact pressure by a step and a projection of the fixed portion by various fixing methods can be controlled.

The water pore may be of a form interspersed around the cylinder or may be a water jacket continuously formed in a wide range of a cylinder periphery.

Further, in the metal gasket, a slit in the shape of a complete round, an ellipse, a square hole and the like is formed in the elastic metal substrate, and an engaging portion integrally formed on the outer periphery of the metal thin plate is engaged with the slit so as to be fixed on the elastic metal substrate. Regarding the number of fixations when the metal thin plate is fixed, it is fixed at as many places as possible so that its shifting can be controlled during operation of the engine. However, when the processing man-hours is considered, it is desirably fixed at one to six places for one cylinder.

In that case, a passage hole of coolant provided in the elastic metal substrate can be used as the slit.

For the shape of the slit, a complete round, an ellipse, a square hole and the like are widely used, but in order to accurately fix the metal thin plate at the proper position of the elastic metal substrate and, moreover, to prevent the shifting, the slit shape is desirably a complete round or an ellipse.

Further, the metal gasket is deformed into a concave portion (convex portion) which continues in one direction by a press working in a thickness direction and is deformed into a convex portion (concave portion) which is opened in a direction to cross the direction and, moreover, by a coupled portion which is wider than the opening portion opened by pressurizing its base by the press working, the elastic metal substrate and the metal thin plate are integrally coupled.

Regarding the number of couplings when the metal thin plate is coupled, it is coupled at as many places as possible so that its shifting can be controlled during operation of the engine. However, when the processing man-hours is considered, it is desirably coupled at one to six places for one cylinder.

Further, the gasket has the elastic metal substrate and the metal thin plate coupled at a mutual bite portion between the metals, on which a surrounding portion of the deformed base deformed by the press in the thickness direction is side by side.

Regarding the number of couplings when the metal thin plate is coupled, it is coupled at as many places as possible so that its shifting can be controlled during operation of the engine. However, when the processing man-hours is considered, it is desirably coupled at one to six places for one cylinder.

Further, the metal gasket has the metal thin plate joined to the elastic metal substrate by spot welding, laser welding and deposition.

Regarding the number of couplings when the metal thin plate is coupled, it is coupled at as many places as possible so that its shifting can be controlled during operation of the engine. However, when the processing man-hours is considered, it is desirably coupled at one to six places for one cylinder.

Further, the gasket has the metal thin plate fixed on the elastic metal substrate by an adhesive.

As for the adhesive to be used in the present invention, any of a film such as synthetic resin, synthetic rubber or natural rubber or a liquid adhesive comprising those as the chief ingredient is adopted. The adhesive which has a hardness at most 90° at a spring type hardness A type test of JIS K6301 is preferable. As specific materials, in the case of rubber materials, there are natural rubber, SBR, NBR, chloroprene rubber, butyl rubber, polysulfide rubber, urethane rubber, silicon rubber, hypelon, acryl rubber, ethylene propylene rubber and the like and, in the case of resin materials, the are selected from urea resin, melanin resin, phenol resin, epoxy resin, vinyl acetate resin, cyanoacrylate, polyurethane, α-olefin-maleic anhydride resin, water high polymer-isocyanate, reaction type acryl resin, denatured acryl resin, vinyl acetate resin emulsion type, vinyl acetate copolymer resin emulsion type, EVA resin emulsion type, acryl resin emulsion type, EVA hot melt type, elastomer hot melt type, polyamide hot melt, synthetic rubber solvent type, synthetic rubber latex type and the like.

DESCRIPTION OF THE PREFERRED EMBODIMENTS

Figure 1:
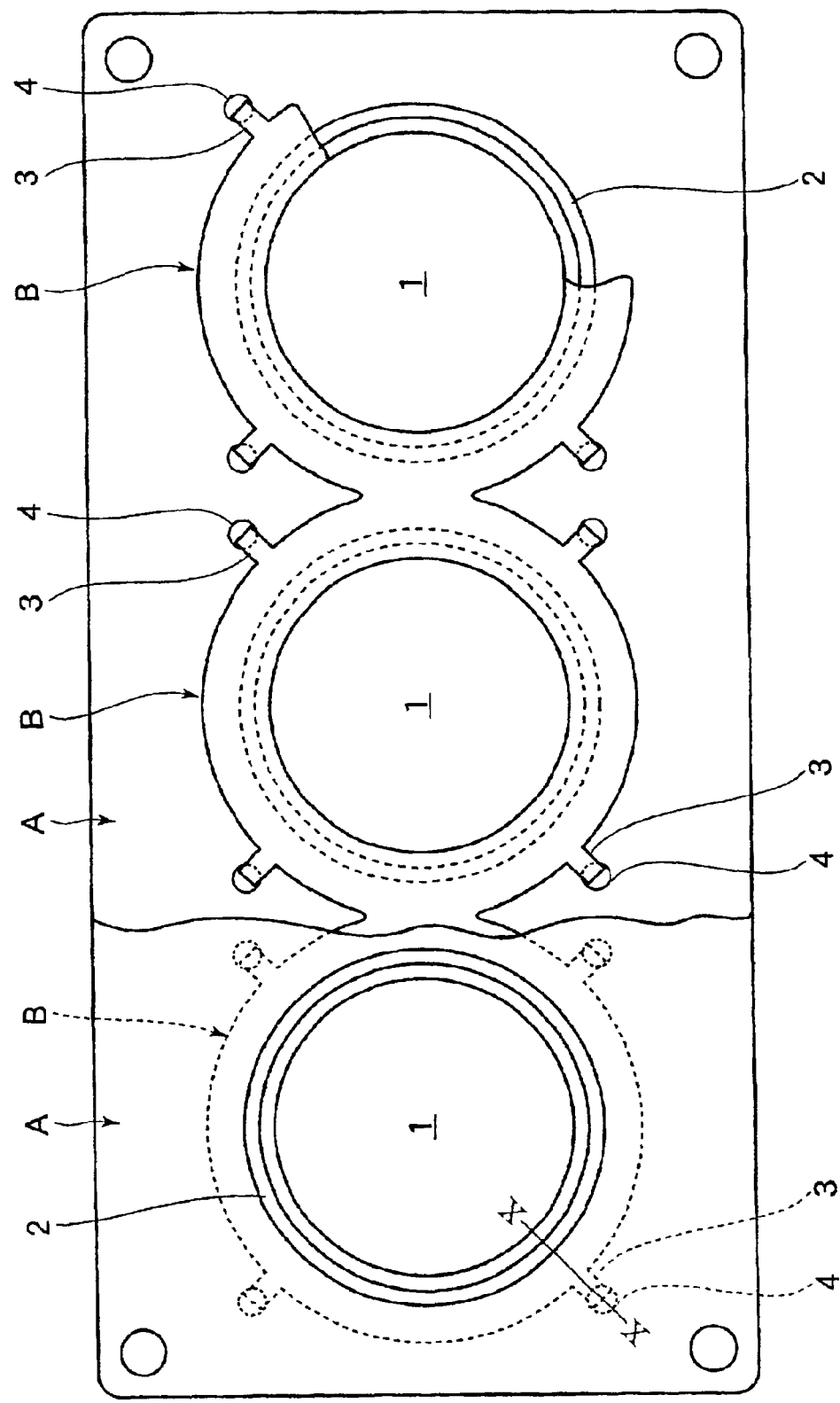
FIG. 1 is a plane view of a metal gasket showing a first embodiment of the present invention.
Figure 2:
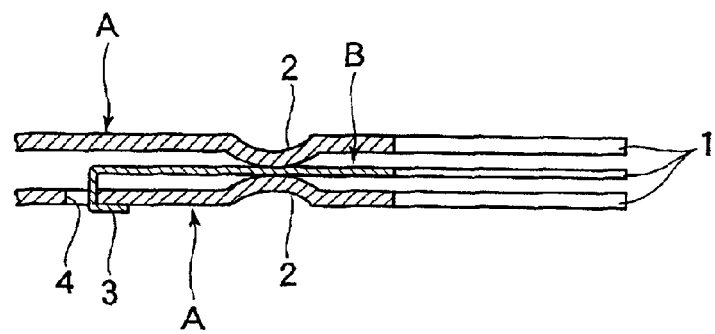
FIG. 2 is a sectional enlarged view cut along the line (X—X) in FIG. 1.

The preferred embodiments of present invention is such that, as shown in FIGS. 1 to 2, the metal casket is constituted by two sheets of elastic metal substrates A, A which form beads 2 on the peripheral portion of cylinder openings 1 and an annular metal thin plate B which is a metal plate thinner than the substrate and surrounds the peripheral portion of the cylinder opening 1 with a predetermined width and, moreover, arranged between the substrates in opposition to the convex portions of the bead 2.

Each annular metal thin plate B is constituted so as to be integrally connected with the adjoining portion and, moreover, the metal thin plate B is fixed to the elastic metal substrate of the slit side by inserting an engaging portion 3 solidly projected from the outer peripheral portion into a slit 4 formed on one elastic metal substrate A and folding it.

A first embodiment of the present invention is shown in FIGS. 1 to 2. FIG. 1 is a plane view of a metal gasket, and FIG. 2 is a sectional enlarged view cut along the line X—X.

In the same drawings, the metal gasket is constituted by two sheets of elastic metal substrates A, A comprising a convex bead formed along each cylinder opening 1 of a multi-cylinder engine and having a thickness of 0.2 to 0.3 mm and an annular metal thin plate B which is a metal plate thinner than the elastic metal substrates A, A and has a thickness of 0.08 to 0.12 mm and surrounds the periphery of the cylinder opening with a predetermined width and, moreover, is arranged between the substrates in opposition to the convex portion side of the bead of the substrate. Further, the each of the annular metal thin plate B is constituted so as to be integrally connected to the adjoining portion.

The each of the annular metal thin plate B is fixed to the elastic metal substrate A of the slit side by inserting the engaging portion 3 solidly projected from the outer periphery into the slit 4 formed on one elastic metal substrate A and folding it.

According to the constitution wherein the metal thin plate B is fixed on the portion surrounding the cylinder opening 1 in relation to the elastic metal substrate A similarly to the metal gasket, the area surrounding the cylinder opening 1 can raise a seal contact pressure at a fastening time as it is thicker by a portion of the metal thin plate B in contrast to other areas.

Further, by widening the metal thin plate B till the bead outer side area, the seal contact pressure of the area surrounding the cylinder opening 1 becomes uniform and, moreover, by fastening the bead by full compression, fatigue resistance of the bead is improved and the contact pressure drop is controlled so that sealing performance rich in durability reliability can be exerted.

Figure 3:
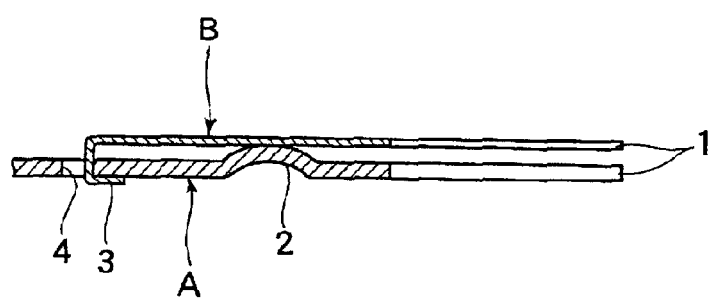
FIG. 3 shows a second embodiment of the present invention and is a sectional enlarged view cut along the line (X—X) in FIG. 1.

In FIG. 3, a second embodiment of the present invention is shown. In the present embodiment, it omits the substrate A to which the metal thin plate B is not fixed from among the elastic metal substrates A, A in the first embodiment, and is constituted by one sheet of the elastic metal substrate A and one sheet of the metal thin plate B.

Figure 4:
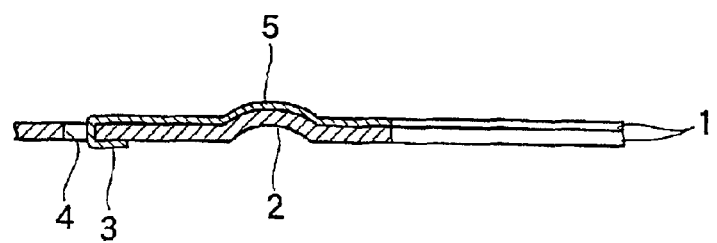
FIG. 4 shows a third embodiment of the present invention and is a sectional enlarged view cut along the line (X—X) in FIG. 1.

In FIG. 4, a third embodiment of the present invention is shown. In the present embodiment, it omits the substrate A to which the metal thin plate B is not fixed from among the elastic metal substrates A, A and is constituted by a bead 5 which coordinates a part of the metal thin plate B fixed to the elastic metal substrate A with the bead 2 of the substrate A in the same direction.

Figure 5:
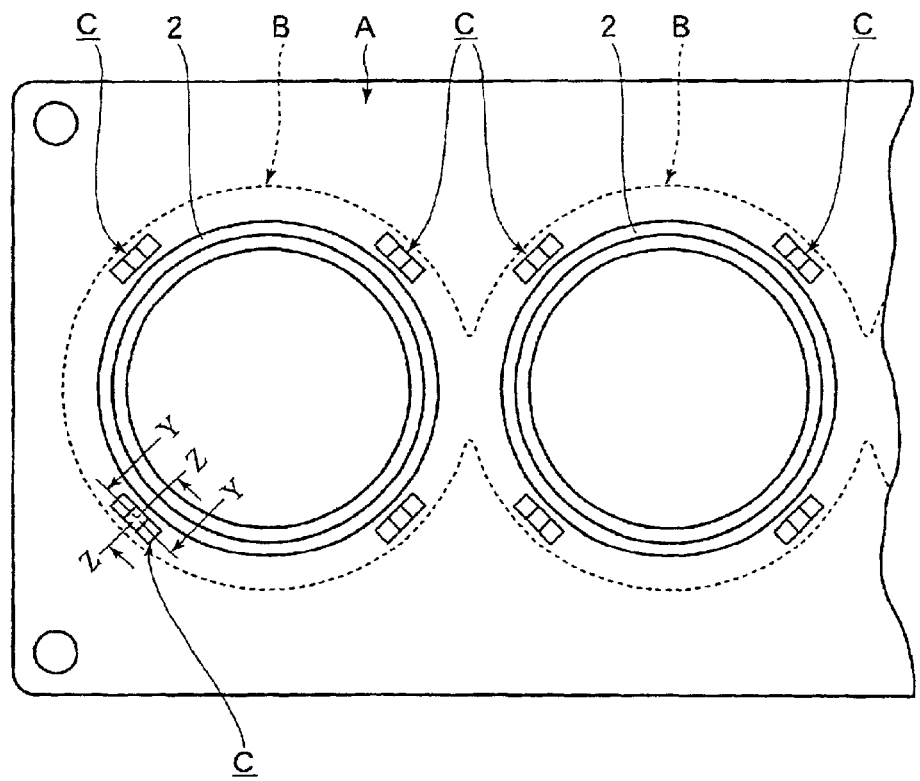
FIG. 5 is a plane view of the metal gasket showing a fourth embodiment of the present invention.
Figure 6:
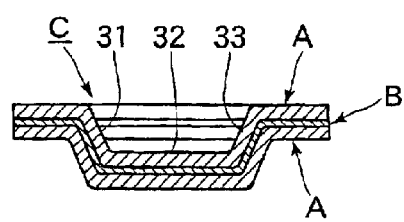
FIG. 6 is a sectional enlarged view cut along the line (Y—Y) in FIG. 5.
Figure 7:
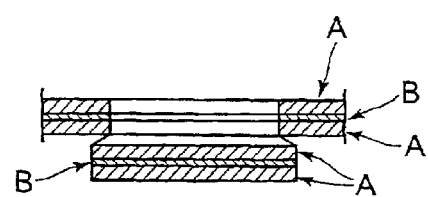
FIG. 7 is a sectional enlarged view cut along the line (Z—Z) in FIG. 5.

In FIGS. 5 to 7, a fourth embodiment of the present invention is shown. FIG. 5 is a plane view of a metal gasket, FIG. 6 is a sectional enlarged view of the line cut along (Y—Y) in FIG. 5, and FIG. 7 is a sectional enlarged view of the line (Z—Z) in FIG. 5.

In the fourth embodiment, it fixes a metal thin plate B to two sheets of the elastic metal substrates A, A by a coupling portion C by a press working and a caulking.

That is, in the Y—Y line direction, as shown in FIG. 6, by the press working in the thickness direction of three sheets of the metal plates in the outside area of the full bead 2, two sheets of the elastic metal substrates A, A and the metal thin plate B arranged between both metal substrates are deform-processed into the convex portions comprising tilting plates 31, 32, 33 which continue to the elastic metal substrate A and the metal thin plate B and subsequently, in the Z—Z line direction, as shown in FIG. 7, the tilting plate portions 31, 32, 33 are deform-pressurized into the concave portions which are cut from the substrate A—the metal thin plate B—the substrate A. By pressurizing the concave base plate portions by a press working, the width in the Z—Z line direction of the base plate portion is rolled wider than the width of the opening cut and is solidly caulked so that the metal thin plate B is fixed to the elastic metal substrates A, A.

Figure 8:
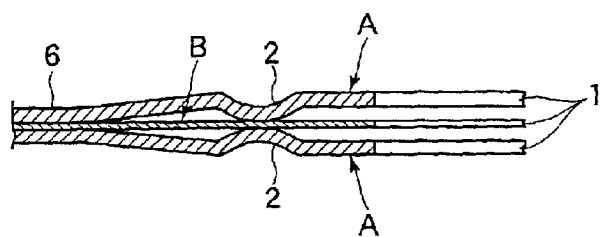
FIG. 8 is a sectional enlarged view of essential part of metal gasket showing a fifth embodiment of the present invention.

In FIG. 8, a fifth embodiment of the present invention is shown. In the present embodiment, as means for fixing the metal thin plate B to the elastic metal substrate A, the metal thin plate B is fixed around the cylinder opening 1 by a spot welding or a laser welding at one to six places in the outside area of a full bead 2 of the elastic metal substrate A.

Figure 9:
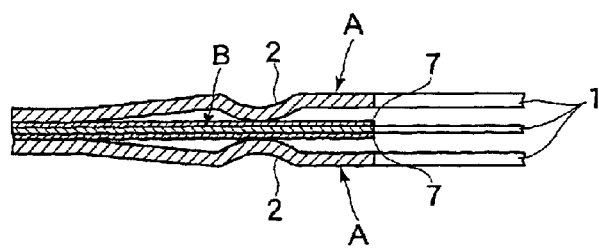
FIG. 9 is a sectional enlarged view of essential part of metal gasket showing a sixth embodiment of the present invention.

In FIG. 9, a sixth embodiment of the present invention is shown. In the present embodiment, as means for fixing the metal thin plate B to the elastic metal substrate A, the metal thin plate B is fixed around the cylinder opening 1 by an adhesive 7. The fixing by this adhesive may be across a full area or a partial area.

Figure 10:
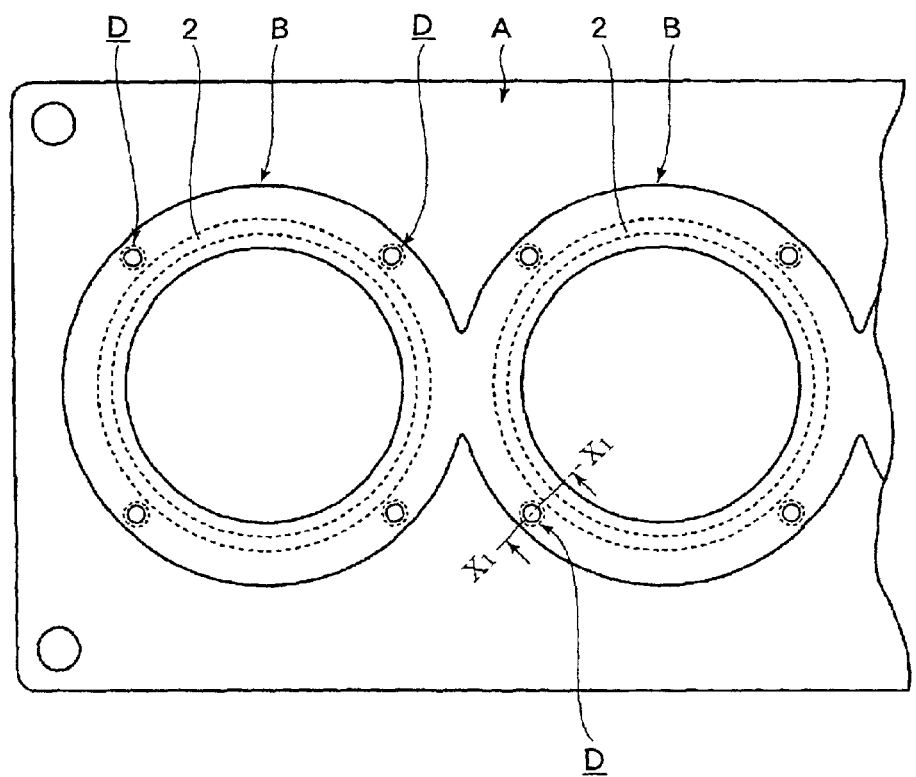
FIG. 10 is a plane view of essential part of metal gasket showing a tenth embodiment of the present invention.
Figure 11:
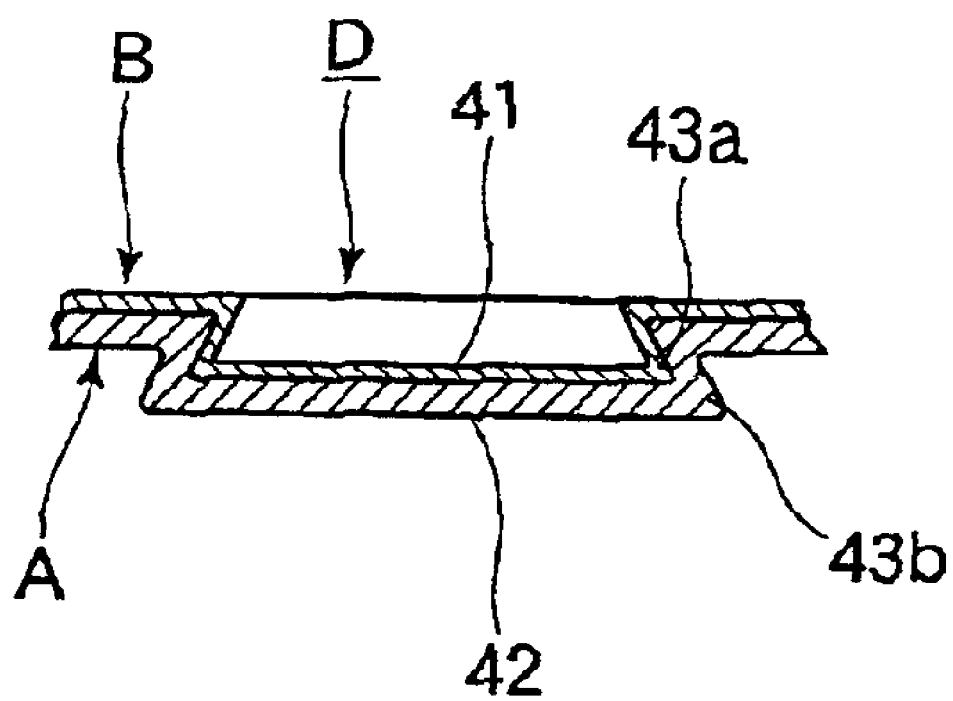
FIG. 11 is a sectional enlarged view cut along the line $(X_1$—$X_1)$ in FIG. 10.

In FIGS. 10 to 11, a seventh embodiment of the present invention is shown. FIG. 10 is a partial plane view of a metal gasket, and FIG. 11 is a sectional enlarged view cut along the line $(X_1—X_1)$ in FIG. 10.

In the seventh embodiment, it fixes one sheet of the elastic metal substrate A and the metal thin plate B to a coupling portion D by the press working.

That is, according to the embodiment, the elastic metal substrate A and the metal thin plate B are deformed by the press in the thickness direction of the metal thin plate in the outside area of the full bead 2, and a portion 43a bites into the elastic metal substrate A around a base inner surface 41 of the metal thin plate B and is further deformed outside into the lateral direction and is formed in a state of biting into a portion 43b around a press base portion 42 of the elastic metal substrate A.

Thus, by the adjacent metal thin plates being deformed by adhering to each other and biting in this way, the metal thin plate B is fixed to the elastic metal substrate A.

Each metal gasket of the second embodiment to seventh embodiment has the same function except that a fixing structure of the metal thin plate B to the elastic metal substrate A is different in relation to the first embodiment.

In the metal gasket, the metal thin plate is fixed in an outside area of the bead provided on the cylinder opening peripheral portion of the elastic metal substrate.

Figure 12:
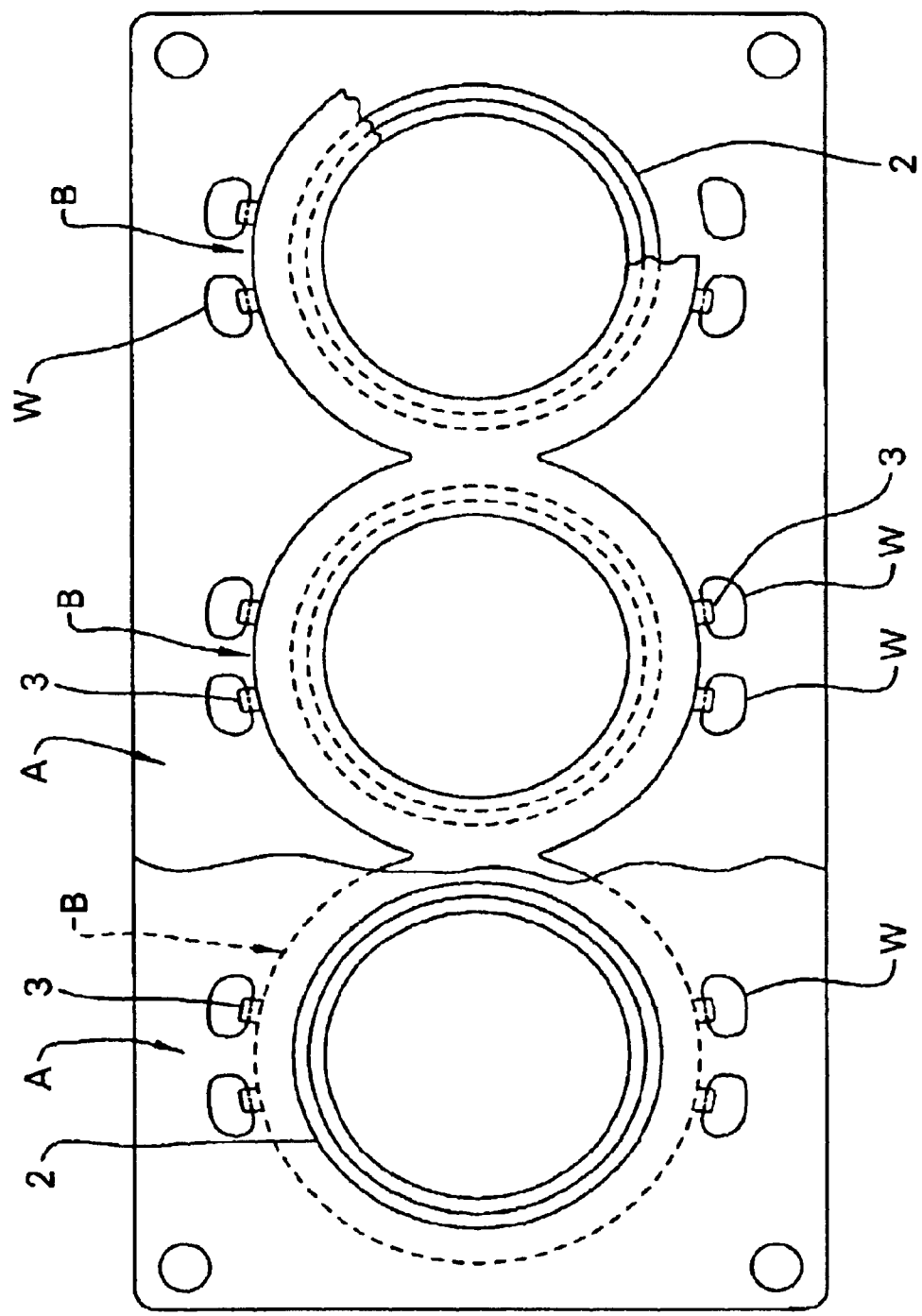
FIG. 12 is a plane view of a metal gasket showing an eleventh embodiment of the present invention.

In the embodiment of FIG. 12, the thin metal plate 2 is fastened on the elastic metal substrate A at a position from an edge of the cylinder side of a water pore W located outside of the cylinder of the engine to a distant side edge of the cylinder in the water pore. Thus functional influences over seal contact pressure by a step and a projection of the fixed portion by various fixing methods can be controlled.

The water pore W may be of a form interspersed around the cylinder or may be a water jacket continuously formed in a wide range of a cylinder periphery.

As described above, according to the present invention, since the metal thin plate is fixed around the cylinder opening for the elastic metal substrate comprising the bead, the area around the cylinder opening is thicker by a board thickness of the metal thin plate in contrast to other areas and, therefore, a seal contact pressure is raised.

Further, by widening the metal thin plate B till the bead outer side area, the seal contact pressure of the area surrounding the cylinder opening becomes uniform and, moreover, by fastening the bead by full compression, fatigue resistance of the bead is improved and the contact pressure drop is controlled so that sealing performance rich in durability reliability can be exerted.

What is claimed is:

1. A metal gasket which is interposed between a cylinder head and a cylinder block and provides a seal therebetween, wherein the metal gasket comprises an elastic metal substrate provided with a bead on a cylinder opening peripheral portion; a portion arranged at a convex portion side of the bead and constituted by a part of a thin metal plate thinner than the elastic metal substrate, the thin metal plate being fastened on the elastic metal substrate at an edge of a cylinder side of a water pore located outside of the cylinder of an engine.

2. The metal gasket according to claim 1, wherein a bead formed on the thin metal plate is in surface-to-surface contact with the bead of the elastic metal substrate.

3. The metal gasket according to claim 1, wherein the thin metal plate is fixed in an outside area of the bead of the elastic metal substrate.

4. The metal gasket according to claim 1, wherein the elastic metal substrate on which the bead is formed about a second cylinder opening peripheral portion is laminated.

5. A metal gasket which is interposed between a cylinder head and a cylinder block and provides a seal therebetween, the metal gasket comprising:
- an elastic metal substrate provided with a bead on a cylinder opening peripheral portion;
- a thin metal plate thinner than the elastic metal substrate, a part of the thin metal plate being arranged at a convex portion side of the bead, the thin metal plate being fixed in an outside area of the bead of the elastic metal substrate,
- wherein the thin metal plate and the elastic metal substrate are deformed into a convex portion or a concave portion which continues in a first direction by a press working and are deformed into a cut concave portion or a cut convex portion in a second different direction from the first direction.

6. The metal gasket according to claim 5, wherein the convex portion or the concave portion forms a coupling having base portions wider than an opening cut by press working.

7. A metal gasket which is interposed between a cylinder head and a cylinder block and provides a seal therebetween, the metal gasket comprising:
- an elastic metal substrate provided with a bead on a cylinder opening peripheral portion;
- a thin metal elate thinner than the elastic metal substrate, a part of the thin metal elate being arranged at a convex portion side of the bead, the metal thin plate being fixed in an outside area of the bead of the elastic metal substrate,
- wherein the thin metal plate and the elastic metal substrate are mutually coupled at a mutual biting portion between metals, to which a surrounding portion of a deformed base portion deformed by a press in the thickness direction is side by side.

* * * * *